Patented Nov. 3, 1953

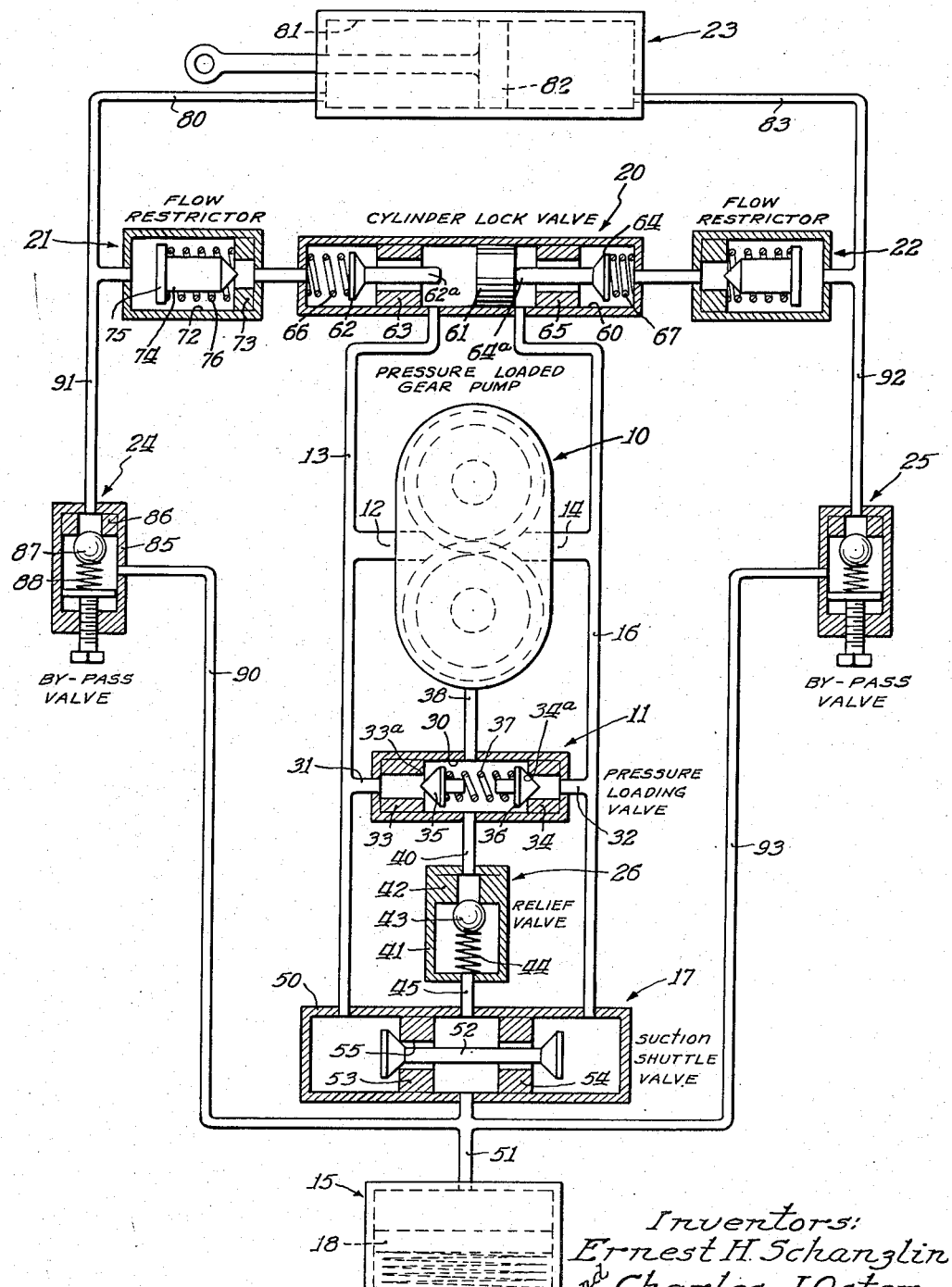

2,657,533

UNITED STATES PATENT OFFICE 2,657,533

HYDRAULIC CONTROL SYSTEM

Ernest H. Schanzlin, Cleveland, Ohio, and Charles J. Oster, Detroit, Mich., assignors to Borg-Warner Corporation, Chicago, Ill., a corporation of Illinois Application March 26, 1951, Serial No. 217,548

3 Claims. (Cl. 60—52)

1

This invention relates to a hydraulic power control system, and more particularly to a hydraulically actuated mechanism for raising or lowering a load including means for controlling the rate of lowering and for preventing dropping of the load in the event of cessation of the hydraulic pressure supply.

The present arrangement is directed particularly to a device for operating the wing folding mechanism of an airplane. The arrangement is, however, adaptable for use in any situation where it is necessary to control closely the rate of raising and lowering of load and to provide means for preventing dropping of the load in the event of failure of the system or in the event the hydraulic power supply is stopped. As the present arrangement is designed particularly for use with aircraft, it is necessary that the weight and bulk of the equipment be maintained at an absolute minimum while at the same time providing the necessary degree of control of operation.

An object of the present invention is to provide a new and improved hydraulic power control system.

In accordance with one embodiment of this invention, a hydraulic power control system for controlling the operation, for example of the wing fold mechanism of an aircraft, may be provided comprising a pressure loadable type gear pump serving as a source of hydraulic pressure, the gear pump being of the completely reversible type and connected through a shuttle valve to a pressurized reservoir or sump. In accordance with the direction of operation of the pump, pressure is supplied through either of two locking valves to a hydraulic piston connected to the wing folding actuating mechanism. As pressure is supplied to one side of the piston through one of the two locking valves, pressure is permitted to return to the reservoir from the other side of the piston through a flow restrictor valve and the other locking valve, the rate of flow being controlled by the flow restrictor valve. Means are included in the system for preventing overload and since the system operates as a substantially closed system, means are also provided for relieving excessive pressure which may be present under standby operation and due to thermal expansion of the hydraulic fluid.

Other objects and advantages of the present invention will be apparent from the following detailed description taken in conjunction with the drawing wherein the single figure is a schematic view of a hydraulic power control system constructed in accordance with one embodiment of this invention.

In the hydraulic power control system for which the arrangement of the present invention is intended, the load is moved positively in either direction; that is to say, that hydraulic pressure is employed to lower and to raise the load. Operator control of the operation of the mechanism is provided by controlling the direction of operation of a reversible, pressure loaded type gear pump 10.

In order to facilitate an understanding of the functions of the individual parts and the cooperation of these parts in the system, the parts will be described generally first and then in more detail thereafter.

The pump 10, which is of the pressure loaded type, such as disclosed and claimed in U. S. Patent No. 2,420,622, is arranged to operate in either direction. In either direction of operation, pressure generated by the pump 10 is applied through a pressure loading valve assembly 11 to the rear or motive surfaces of a pair of axially movable, pressure loadable bushings to cause these bushings to move into sealing engagement with the gear side faces and thereby to develop maximum pressure. Initial loading, of course, is provided by compression springs associated with these bushings which provide sufficient sealing engagement to cause the pump to develop some pressure upon initial rotation. Assuming the pump is discharging to the left, as viewed in this figure, pressure generated by the pump is discharged through port 12 to line 13, and fluid is admitted to the pump through port 14 which is connected to a sump 15 through line 16. A suction shuttle valve 17 prevents return of pressure through the line 13 to the sump 15, while permitting fluid to be drawn from the sump through the right-hand end of the shuttle valve assembly, the line 16 and the port 14. Sump 15 is suitably arranged as by weighted piston 18 to maintain the fluid therein at a pressure slightly above atmospheric, whereby to exclude air from the system and prevent cavitation.

Pressure generated by the pump 10 is applied through the line 13 to the left end portion of a cylinder locking valve assembly 20 which is arranged to permit application of pressure applied to either end thereof, in accordance with the direction of rotation of the pump, through a flow restrictor valve 21 located at the left side thereof or through a flow restrictor valve 22 located at the right side thereof to either end of a hydraulic motor 23. When pressure is applied through the left portion of the cylinder locking valve 29 a piston 82 of the motor 23 is moved to the right and fluid trapped in the motor chamber is then returned to the sump through the right flow restrictor valve, which controls the rate of return flow, and thereby the rate of movement of piston 82, and through the right end of the cylinder locking valve to the inlet line 16 and from thence through the open right-hand portion of the shuttle valve 17.

In the standby condition, thermal bypass and relief valves 24 and 25 are effective to prevent undue pressure developing within the system. Also, a relief valve 26 is associated with the pressure loading valve assembly 11 to limit the maximum pressure which may be developed by the pressure generator 10.

Referring now in more detail to the elements of this system, it will be seen that the pressure loading valve 11 comprises a valve chamber 30, the left end of which is connected to the line 13 through a short line 31 and the right end of which is directed to the line 16 through a short line 32. Sleeve inserts 33 and 34, positioned respectively at the left and right ends of the chamber 30, define at their inner ends valve seats 33a and 34a with which cooperate, respectively, valve members 35 and 36. These valves, as illustrated, are of the conical type and are urged apart and into seating relation with their associated valve seats by a light, coiled compression spring 37. Line 38 directs pressure, which is admitted to the valve chamber 30 either through the line 31 or the line 32 to the rear of the pressure loadable bushings of the pump 10.

Thus, for example, where the pump is actuated to discharge to the left through the port 12, pressure will be admitted to the valve chamber 30 through the line 31 and, since the spring 37 is made relatively light, will be effective to cause left valve 35 to open and thereby to admit pressure through the line 38 to the rear of the pressure loaded bushings. Conversely, where the pump is actuated to operate in the reverse direction, pressure is then admitted through the short passage 32 to the right-hand end of the valve chamber. The valve 35 will then be seated and the valve 36 will then be unseated against compression of spring 37. The valve, of the two valves 35 and 36, which is located on the low pressure side is, of course, held seated both by the spring 37 and by the low pressure value existing on the far side of the valve.

Control of the maximum pressure developed by the pump 10 is provided by the relief valve 26 which is connected through line 40 to the open center of chamber 30 and which comprises a valve housing 41 having a valve seat insert 42 positioned in the upper end thereof with which cooperates a ball type valve 43 urged into seating relation with valve 42 by spring 44. When the pressure in the chamber 30 exceeds a predetermined maximum value, as set by the spring 44, the valve 43 will open and permit return of pressure through line 45 to the open center of suction shuttle valve chamber 17 and from there to the sump 15, thus limiting the maximum pressure which may be developed by the pump 10.

Referring now to the suction shuttle valve 17 more in detail, this comprises a cylindrical housing 50 which has an open center connection through line 51 to the sump and which is connected adjacent either end, respectively, to the lines 13 and 16, connecting to the ports 12 and 14, respectively, of the pump 10. A double-ended spool valve 52 is positioned in the valve chamber 50 and slidably supported in two spaced, internally grooved valve seat inserts 53 and 54, which are located to the left and to the right, respectively, of the point of connection of the line 51. Where the pump 10 is discharging to the left, then fluid is supplied to the pump 10 from the right side of piston 82. However, when the pump 10 is discharging to the right the supply of fluid on the left side of piston 82 would be inadequate because of the displacement of the piston rod, and consequently the additional fluid required is drawn from the sump 15 through the suction shuttle valve on the left side thereof, the suction of the pump 10 causing the shuttle valve member 52 to shift to the left to provide a passage 55 through the left valve seat insert 53. This causes the right end of the spool valve 52 to seat on valve seat 54, to prevent return of pressure to the sump return line 51 from line 16. This seating is further assured by virtue of the pressure exerted against the exposed right end of the spool valve member 52. Conversely, when the pump 10 is operated to discharge to the left through port 12, then the right side of the valve chamber 50 may become the suction side if necessary to maintain the system filled. The shuttle valve member 52 is shifted to the right and the left end portion of the valve member 52 seats to prevent return flow through the line 13 to the sump. Since the center portion of the valve chamber 50 is always in communication with the sump, in the event the pressure generated by the pump 10 exceeds a predetermined desired maximum, then opening of the relief valve 26 permits return flow through the open center to the sump.

Turning now to the cylinder locking valve 29, the primary function of this cylinder locking valve is to permit return flow from the hydraulic motor 23 during movement of the motor piston, while when the pressure generator 10 is not being actuated, to prevent any movement of this piston. Cylinder locking valve 29 comprises a cylindrical chamber 60 in the middle portion of which is journalled a cylindrical block 61 forming a piston. In the left portion of the chamber 60 there is supported a valve 62 in an annular valve seat insert 63, while in the right portion there is supported a similar valve 64 in a valve seat insert 65. These inserts 63 and 65 are located to the left and to the right, respectively, of the points of connection of the lines 13 and 16 and beyond either extreme operating position of piston 61 so as to avoid blocking thereby. Stem 62a of valve 62 extends to the right through the insert 63 so as to be engageable by, an abutting relation, the piston 61 when it is shifted to the left, and similarly stem 64a of valve 64 extends to the left through insert 65 to be engaged by the piston 61 when moved to the right. Both of the valves 62 and 64 are normally held closed by associated springs 66 and 67 respectively. These springs are made relatively light and the valves open readily in response to the application of fluid pressure to the underside of the valve or in response to the mechanical pressure exerted by the piston 61.

Assuming that the pump 10 is discharging to the left, pressure is then communicated through the line 13 upwardly to the left portion of chamber 60. This pressure urges the piston 61 to the right, to cause the valve 64 to be unseated and at the same time this pressure is permitted to pass to the left by unseating valve 62. Pressure escaping to the left through valve 62 is directed through the open flow restrictor valve 21 to the left end of the hydraulic motor piston 82.

The two flow restrictor valves 21 and 22 are of substantially identical design and may be constructed in accordance with the disclosure of U. S. Patent 2,307,949 to Phillips. In simplified form these valve comprise a valve chamber 72 in the end of which connected to the cylinder locking valve 20 there is positioned an annular valve seat insert 73 and a conical tipped valve member 74 arranged to seat thereon, the valve member 74 having a flange 75 provided on the end thereof away from the cylinder locking valve 20. Spring 76 associated with valve 74 normally holds the valve open and, hence, when pressure is applied thereto from the cylinder locking valve, the restrictor valve merely shifts to full open position. Pressure applied from the end of the valve chamber away from the cylinder locking valve is applied to the rear exposed surface of the flanged portion 75 and tends to cause the valve to seat, this tendency being restricted by the spring 76. By a careful selection of the area of flange 75 and the compression force of spring 76, the flow possible through this valve may be closely regulated.

Thus, when pressure is supplied to the hydraulic piston 82 through the left portion of the cylinder locking valve 20, the open restrictor valve 21 and line 80, which connects the left end of flow restrictor valve 21 to the left end of the hydraulic piston chamber 81, the hydraulic piston proper 82 will tend to be shifted to the right. Movement to the right would not be possible unless some means were provided for permitting fluid trapped in the right portion of chamber 81 to return to the sump or otherwise to escape. This means is provided in accordance with this invention by the operation of the piston 61, which by shifting to the right, as before explained, opens valve 64, thus permitting return flow through line 83, which connects the right flow restrictor valve 22 to the right end of the chamber 81 and this return flow is, of course, metered by the right flow restrictor valve 22.

Where the pump 10 is operated in the reverse direction from that just described and pressure is applied through line 16 to the right portion of the cylinder locking valve 20, then of course the piston 61 is shifted to the left to unseat valve 62 and the valve 64 is unseated by virtue of the pressure applied to the underside thereof. Pressure is then communicated through the normally open flow restrictor valve 22, the line 83 to the right end of the piston chamber 81. Pressure so communicated is effective to shift piston 82 to the left and cause return flow of fluid trapped in the left portion of the chamber 81 through the line 80, through the flow restrictor valve 21, which controls the rate of return flow through the open valve 62 to the return line 13. Return line 13, under this circumstance, is in communication with the sump by virtue of the shifting of the shuttle valve member 52 from the position illustrated in the drawing to the left.

In the standby condition it will be apparent that both of the cylinder locking valves 62 and 64 will be seated by virtue of the springs 66 and 67 associated therewith. This is desirable since upon failure of the pressure generator 10 for any reason, it is desirable to prevent further movement of the piston 82, representing the load. Also, it will be apparent that with this arrangement, the load will be hydraulically held in whatever position it is in when the pump 10 is stopped. However, it has been found that under some circumstances, particularly where employed with aircraft which may be exposed to considerable variations of temperature, the hydraulic fluid in the lines and in the chamber 81 may be subjected to expansion. In accordance with this invention there is provided the pair of thermal relief or bypass valves 24 and 25. In the event expansion of the fluid in the system causes undesirable pressure to be developed, one of these valves 24 or 25, depending on which side of the system is under pressure, will open and permit return flow to the sump. These standby relief valves are normally set to open at a pressure value substantially higher than that for which maximum operating pressure relief valve 26 will open. The standby valves each comprise a housing 85 containing a valve seat insert 86 arranged to seat thereon, a ball valve 87 and a compression spring 88 urging the ball valve into seating relation with the seat 86. Valve 24 is connected to the sump line 51 through line 90 and connected to the hydraulic pressure line 80 through line 91. Relief valve 25 is connected to the hydraulic pressure line 83 through line 92 and to the sump through line 93.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawing.

What is claimed is:

1. In a hydraulic power control system, a source of fluid, a pressure loaded type, intermeshing gear pump having at least one set of axially movable, pressure loadable bushings adapted to be moved into sealing engagement with the associated gear side faces in response to generation of pressure by said pump, pressure loading valve means associated with said pump for preventing escape of pressure loading fluid generated by said pump to said fluid source and for applying loading pressure to said movable bushings, a suction shuttle valve for rendering said pressure loading valve means effective and for preventing return of fluid to said fluid source upon operation of said pump in either direction, a hydraulic piston adapted to be shifted in one of two directions in accordance with the direction of operation of said pump, cylinder locking valve means for preventing movement of said piston when said pump is not operating, flow restrictor valve means associated with said cylinder locking valve and including movable members responsive to excess flow for further restricting the flow for controlling the rate of return flow from said piston, and relief valve means associated with said pressure loading valve means for controlling the maximum pressure applied to said piston when said pump is operating.

2. In a hydraulic power control system, a source of fluid, a pressure loaded type, intermeshing gear pump having at least one set of axially movable, pressure loadable bushings adapted to be moved into sealing engagement with the associated gear side faces in response to generation of pressure by said pump, pressure loading valve means associated with said pump for preventing escape of pressure loading fluid generated by said pump to said fluid source and for applying loading pressure to said movable bushings, a suction shuttle valve for rendering said pressure loading valve means effective and for preventing return of fluid to said fluid source upon operation of said pump in either direction, a hydraulic piston adapted to be shifted in one of two directions in accordance with the direction of operation of said pump, cylinder locking valve means for preventing movement of said piston when said pump is not operating, flow restrictor valve means associated with said cylinder locking valve and including movable members responsive to excess flow for further restricting the flow for controlling the rate of return flow from said piston, relief valve means connected in said system for limiting the maximum pressure in said system under standby conditions, and a relief valve associated with said pressure loading valve means for controlling the maximum pressure developed by said pump during pressure generation.

3. In a hydraulic power control system, a reversible, pressure loaded type, intermeshing gear pump having at least one set of axially movable, pressure loadable bushings adapted to be moved into sealing engagement with the associated gear side faces in response to the generation of pressure by said pump, said pump having a pair of ports associated therewith, one of said ports serving as the inlet port when said pump is operating in one direction and the other of said ports serving as the inlet port when the pump is operating in the reverse direction, a sump, a suction shuttle valve having an open center connection to said sump, a port provided adjacent either end of said shuttle valve, one of said ports being placed in communication with said open center connection in one position of said shuttle valve and the other of said ports being placed in communication with said open center connection in an alternate position of said shuttle valve, means connecting one of said pump ports to one of said shuttle valve ports, means connecting the other of said pump ports to the other of said shuttle valve ports, the shuttle valve port connected to the pump port serving as the inlet port of the pump being placed in communication with said sump by shifting of said shuttle valve, a hydraulic motor comprising a cylinder in which is journalled a longitudinally shiftable piston, means connecting one end of said cylinder to one of said pump ports whereby said piston is shifted in one direction when the pump is operated in one direction, means connecting the other end of said cylinder to the other of said pump ports whereby said piston is shifted in the opposite direction when the pump is operated in the reverse direction, each said cylinder end connecting means including a check valve and a restrictor valve interposed between said check valve and said cylinder, a piston member associated with said check valves, resilient means for urging said check valves toward closed position in accordance with the direction of operation of said pump, one of said check valves opening in response to application of pressure from said pressure generator and the other of said check valves opening in response to application of pressure to said piston member to cause said piston member to move with said other check valve to open position, each of said restrictor valves including a movable member responsive to excess flow in one direction for further restricting the flow to control the flow rate in response to movement of said piston in one direction, one of said restrictor valves being effective in accordance with the direction of operation of said pump to control the rate of return flow through the associated check valve in response to movement of said piston, pressure loading valve means associated with said pump for directing loading pressure generated by said pump to said movable bushings to move said bushings into sealing engagement and for preventing escape of loading pressure to said sump through the one of said connecting means then acting as the supply line, and relief valve means associated with said pressure loading valve means for controlling the maximum pressure applied to said bushings, whereby to control the maximum pressure developed by said pump.

ERNEST H. SCHANZLIN.
CHARLES J. OSTER.

References Cited in the file of this patent

UNITED STATES PATENTS

| Number | Name | Date |
|---|---|---|
| 1,307,839 | Williams | June 24, 1919 |
| 1,912,184 | Ferris et al. | May 30, 1933 |
| 2,417,278 | Van Der Werff | Mar. 11, 1947 |
| 2,420,622 | Roth et al. | May 13, 1947 |
| 2,437,115 | Muller et al. | Mar. 2, 1948 |
| 2,437,791 | Roth et al. | Mar. 16, 1948 |
| 2,467,508 | Trautman | Apr. 19, 1949 |
| 2,467,509 | Trautman | Apr. 19, 1949 |